Oct. 18, 1932.  J. M. HALL  1,882,833
SHOCK ABSORBER
Filed April 9, 1923   3 Sheets-Sheet 2
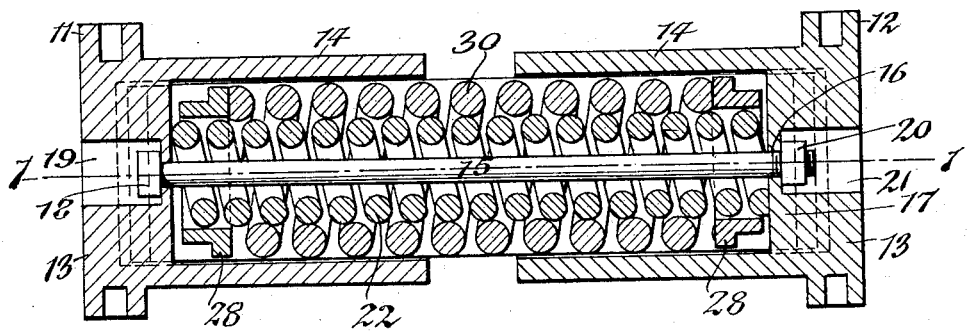
Fig.5.
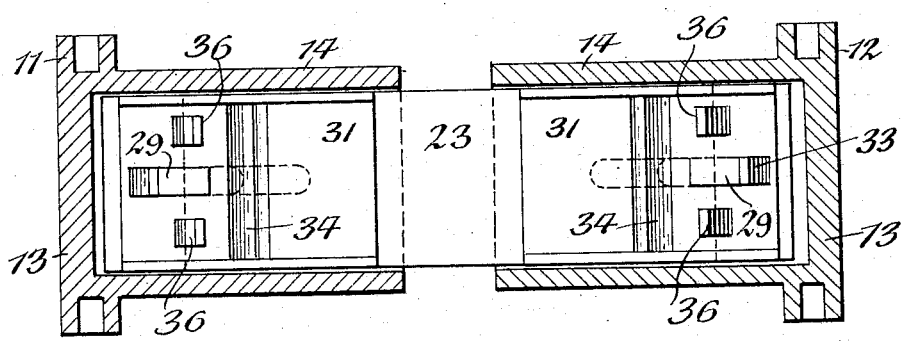
Fig.6.
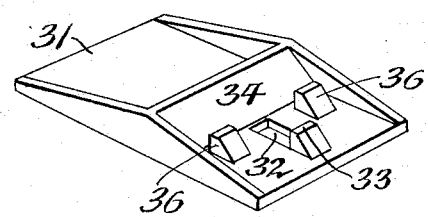
Fig.7.  Joseph M. Hall
Inventor
by Geyer & Popp
Attys.

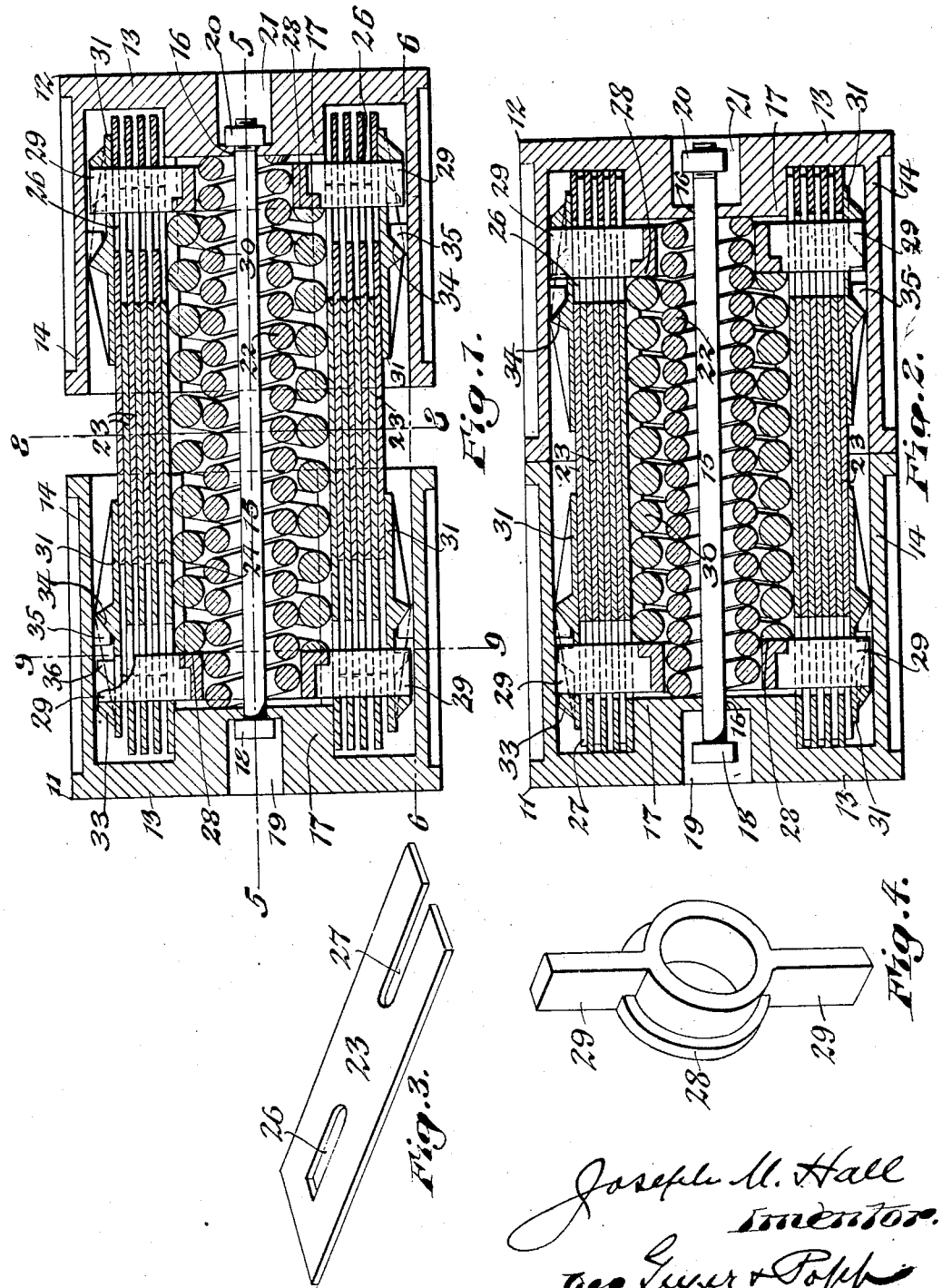

Oct. 18, 1932.  J. M. HALL  1,882,833
SHOCK ABSORBER
Filed April 9, 1923  3 Sheets-Sheet 3

Joseph M. Hall
Inventor
by Guyer & Popp
Attys

Patented Oct. 18, 1932

1,882,833

UNITED STATES PATENT OFFICE

JOSEPH M. HALL, OF HAMILTON, ONTARIO, CANADA, ASSIGNOR TO UNIVERSAL DRAFT GEAR ATTACHMENT CO., A CORPORATION OF ILLINOIS

SHOCK ABSORBER

Application filed April 9, 1923. Serial No. 630,730.

This invention relates to a shock absorber which is more particularly designed for use in the draft gears of railway cars and the same is of that type in which two sets of intercalated plates are frictionally engaged with each other to resist the load which is imposed on the gear and thus reduce the shock to the car and the cargo or passengers carried thereby.

One of the objects of this invention is to so organize the gear that the friction shoes are forced inwardly relatively to the longitudinal line of movement of the gear under the load, instead of outward as heretofore, and thereby permit of simplifying the construction, reducing the number of parts, reducing the weight of the parts for a certain strength, and thus effecting a considerable economy in cost of manufacture.

Another advantage attained by this invention is that more room is obtained for the springs which permits of a higher draft gear capacity within the same outside dimensions.

Furthermore, the present improvement permits of eliminating the wear of the friction plates on the outer or side walls of the housing which is due to placing the friction shoes between the friction plates and the housings.

Moreover, this organization of draft gear is so designed that the means for releasing the same are simplified by utilizing the friction spring seat as a release member while the draft gear is operating in release.

Figure 8:
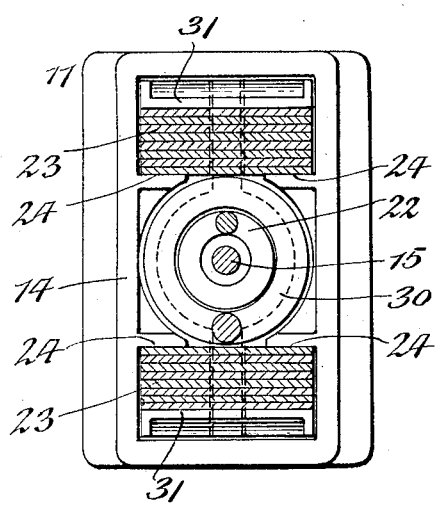
Figure 9:
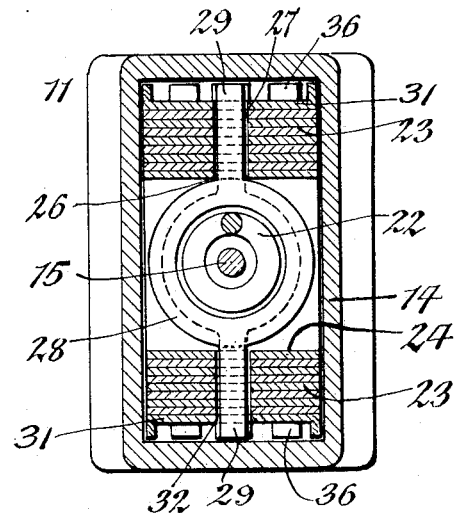
Figure 10:
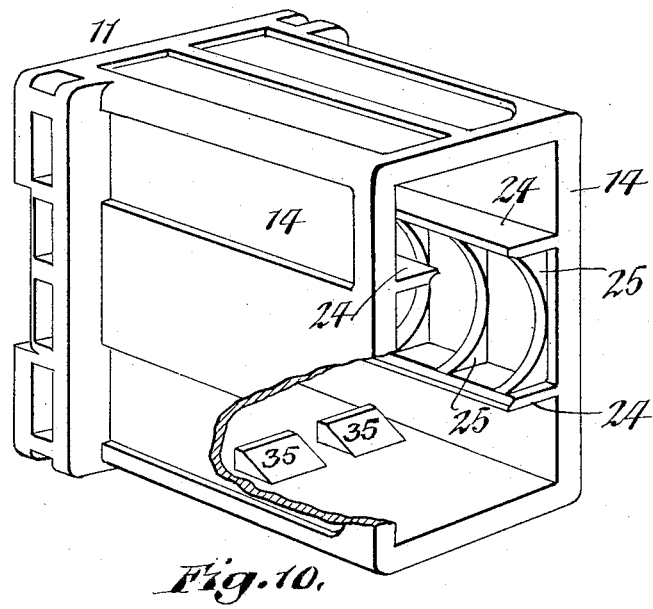

In the accompanying drawings: Figure 1 is a longitudinal section of my improved draft gear taken on line 1—1, Fig. 5, and showing the same in an open or release position. Figure 2 is a similar view showing the same in a closed or loaded position. Figure 3 is a perspective view of one of the friction plates. Figure 4 is a similar view of one of the followers forming a release bar and spring seat. Figures 5 and 6 are longitudinal sections taken on the correspondingly numbered lines in Fig. 1. Figure 7 is a perspective view of one of the friction shoes. Figures 8 and 9 are transverse sections taken on the correspondingly numbered lines in Fig. 1. Figure 10 is a perspective view of one of the housings, partly broken away.

Similar characters of reference indicate corresponding parts throughout the several views.

Although the shock absorber is intended mainly for railway cars, it is to be understood that the same is applicable to other uses which require cushioning of the impact of a moving load. When used in railway service, this shock absorber is arranged between the longitudinal draft sills or beams of the car and installed in such manner that the same will be in its normal fully opened or released position when the car is at rest but will be closed or compressed more or less when subjected to the pushing or pulling effect when the car is started either backwardly or forwardly on the coupler of the car.

This improved shock absorber may be varied as to its details of construction and in the accompanying drawings, which show one embodiment of my invention, the same is constructed as follows:

At its opposite ends the shock absorber is provided with two cap-shaped housings 11, 12, which are mounted axially in line lengthwise of the car and have their open or concave sides facing each other. Each of these housings is preferably made of cast metal such as cast iron or steel, and has a transverse outer head or follower 13 and a side wall 14 which is of substantially rectangular form in cross section and projects inwardly from the edge of the respective head. These housings are held in an assembled position and prevented from moving lengthwise apart from each other beyond a predetermined limit but are free to approach each other, this being preferably accomplished by a tie rod 15 arranged lengthwise in the center of the shock absorber and extending through openings 16 in the bosses 17 on the central part of the housings, one end of this rod being provided with a bead 18 which is adapted to bear against the bottom of a recess 19 in the outer side of one of the housing heads and the other end of this rod being provided with a screw nut 20 which is adapted to bear against the bottom of a recess 21 in the outer side of the other housing head. The two housings are moved away from each other and yieldingly held apart by a releasing spring 22 which surrounds the tie rod and bears at its opposite ends against the inner sides of the bosses 17 of the housing heads.

On opposite sides of the longitudinal axis of the shock absorber are arranged two sets of longitudinal friction plates 23, the members of each set being composed of two groups which are intercalated and the members of each group being operatively associated with one of said housings, so as to move lengthwise therewith part of the time but permit the respective housing to move independently of the plates at other times. The two sets of plates are supported on the inner sides of the same by two inner longitudinal supporting and guiding faces 24 each of which is constructed in the form of two flanges, shelves or sections which are preferably cast integrally with the respective housing and is connected on its inner side by transverse ribs 25 with the adjacent part of the housing and the companion shelf of the other plate support, and the two supporting and guiding surfaces of each housing being preferably in line with opposite sides of the boss on the inner side of the head thereof. Each of these plates is of such length and so arranged that the outer end thereof next to the housing, whereby the same is actuated at times, will engage and disengage with the head of said housing but the opposite inner end of this plate stops short of the head of the other housing and at no time engages the same. Each of the friction plates is provided in its outer part with a longitudinally elongated shifting opening or slot 26 while its inner part is provided with a longitudinal clearance slot 27 extending to the corresponding end of this plate.

Adjacent to the inner side of the head of each housing is arranged a shifting member which comprises a central spring seat 28 having the form of a ring, and two arms 29 projecting laterally from opposite sides of the spring seat and together forming a release bar. Each arm of a release bar passes through the shifting slots or openings 26 in the outer ends of one group of a set of friction plates and also through the clearance slots 27 in the inner ends of the other group of plates of the same set. The width of each arm of a release bar is somewhat less than the length of the shifting slots through which the same passes and in the operation of the device the outer edge of this arm at times engages the outer ends of the respective shifting slots but the inner edge at no time engages with the inner ends of the shifting slots nor with the inner ends of the adjacent clearance slots.

Surrounding the release spring is a friction or resistance spring 30 which is heavier than the release spring and which is arranged between the two sets of friction plates and bears with its opposite ends against the annular seats of the two shifting members.

A plurality of friction shoes 31 are employed for pressing the several sets of friction plates inwardly toward each other and the supporting shelves 24 and causing these plates to grip each other frictionally and resist the inward longitudinal movement of the groups of plates associated with the two housings for the purpose of absorbing the shock of the load which is moving the two housings one toward the other. One of these friction shoes is arranged lengthwise between the inner side of the wall of one housing and the adjacent outer part of one set of friction plates and is provided on its inner side with a flat longitudinal bearing face which engages with the flat outer side of the adjacent friction plate. In its outer part each friction shoe is provided with a coupling opening 32 which receives the outer end of one arm of one of the release bars, so that the same are compelled to move together at all times in a direction lengthwise of the device. On its outer side each of the friction shoes is provided with an outer reinforcing lug 33 which is in line with the outer end of the coupling opening 32 and provides an extended or wider bearing surface on the shoe for the respective arm of the adjacent release bar, a pressing cam 34 having an outwardly facing incline which engages with inwardly facing inclines formed on lugs 35 arranged on the adjacent inner side of the wall of the respective housing and two stop lugs 36 arranged on the outer side of the friction shoe on opposite sides of the coupling opening 32 and adapted to engage with the outer side of said cam lugs 35.

*Operation*

When the shock absorber is in release position, as shown in Figs. 1, 5 and 6, the two housings are spread apart as far as possible mainly by the direct action of the release spring 22 and partly by the indirect action of the resistance spring 30, so that the head and nut of the tie rod engage with the outer side of the housings, the release bars and shoes are in the outermost position, the friction plates are subjected to the minimum inward pressure and thus secure the least frictional contact between them which has been previously determined, the release bars engage their outer edges with the outer edges of the shifting openings in the plates, and the outer edges of the plates are spaced apart from the inner sides of the heads of the housings.

When a load or shock is applied to either of the housings the force of which is sufficient to overcome the tension of the release spring, one of the housings will move toward the other and in some installations, both housings may take part in this movement but the effect will be the same. While the housings are thus moving toward one another, the resistance springs 30 tends constantly to force the friction shoes outwardly in a direction opposite to that in which the housings are moved while the shock absorber is being closed. As the housings are moved toward their closed position, the friction shoes are moved forwardly by engagement of the pressing lugs 35 on the housings against the pressing lugs 34 on the shoes and at the same time the shoes are pressed transversely inwardly toward the axis of the shock absorber by the wedging action of the co-operating inclines on these housing lugs and shoe lugs. By this means the groups of plates of each set are pressed together and the same are caused to engage or grip against each other so as to increase the frictional contact between the same and increase their resistance against longitudinal movement one relatively to the other. The friction shoes effect their initial inward longitudinal movement for producing a transverse inward pressure against the plates before the heads engage the outer ends of the plates and move the latter longitudinally inwardly. After the initial longitudinal movement of the shoes has been effected and the plates have been pressed together by the shoes, the heads of the housings during the continued longitudinal inward motion by engaging the outer ends of the plates, cause the latter to be moved longitudinally inwardly, but in opposition to the friction spring and the increased frictional resistance exerted by the pressure of the plates against one another. While the friction shoes are moved inwardly by the housings during the initial inward movement of the latter, the release bars are carried inwardly away from the outer ends of the coupling slots in the outer ends of the friction plates, so that when the heads of the housings engage the outer ends of the friction plates the release bars are not influenced directly by the inward motion of the housings, whereby the full pressure of the friction spring is exerted on the shoes through the medium of the release bars. This causes a resistance against longitudinal inward movement of the shoes and increases the wedge action of the housing on the same to still further force the shoes transversely inward and increase the frictional resistance for retarding the inward movement of the plates relatively to each other and thus absorb the shock of the load with a gradually increasing resisting effect until the maximum capacity of the gear has been reached which occurs when the opposing inner ends of the housings meet, as shown in Fig. 2.

When the load upon the shock absorbing gear is released the friction springs tends to force the housing longitudinally outward or apart from each other, during which time this spring, by engaging the spring seats of the release bars, tends to force the release bars and friction shoes in the same direction. This operation continues in this manner until the release bars engage the outer ends of the coupling holes or slots in the friction plates. When this engagement takes place, the release spring forces the housings outwardly, thereby releasing the wedging pressure of the same against the friction shoes, thereby relieving the pressure against the friction plates sufficient to permit the friction spring to carry the plates outwardly into their fully open or release position. The stop lugs 36 on the friction shoes serve to limit the outward movement of each housing relative to the respective shoe, while the gear is being released, and thus prevents the gear from being disarranged in case one housing of the gear should go to release position ahead of the other, thereby compelling both ends of the gear to operate alike.

It will be noted from the foregoing that when the draft gear is being compressed the full load of the friction spring is exerted on the friction shoes without however any pressure by the release bars against the friction plates, and on release of the load the pressure of the friction spring is transferred to the friction plates for bringing them back to release position.

I claim as my invention:

1. A shock absorber, comprising two housings movable lengthwise relatively to each other, a plurality of intercalated friction plates arranged lengthwise within said housings and on one side of the axis of the same, said plates comprising groups one of which is operatively associated with one of said housings and the other group operatively associated with the other housing, means for producing a pressure against said plates transversely inward or toward the axis of said housings upon moving one of said housings toward the other and relieving said pressure upon separating said housings and springs to hold the plates in frictional engagement during compression and to return them to normal position upon release.

2. A shock absorber comprising two housings movable lengthwise relatively to each other, supports arranged within the housings and facing laterally outward relative to the axis of movement of said housings, a plurality of intercalated friction plates arranged lengthwise within said housings and comprising groups one of which is operatively associated with one of said housings and the other operatively associated with the other housing, means interposed between the outer side of said friction plates and said housings for producing a transversely inward pressure on said plates when moving one of said housings longitudinally toward the other housing and to release said pressure upon moving said housings lengthwise apart from one another and springs to hold the plates in frictional engagement during compression and to return them to normal position upon release.

3. A shock absorber, comprising two housings movable lengthwise relatively to each other, a plurality of intercalated friction plates arranged lengthwise within said housings and on one side of the axis of the same, said plates comprising groups one of which is operatively associated with one of said housings and the other group operatively associated with the other housing, means for producing a pressure against said plates transversely inward or toward the axis of said housings upon moving one of said housings toward the other and relieving said pressure upon separating said housings, comprising friction shoes engaging with the outer longitudinal sides of the friction plates and adapted to be moved inwardly toward the axis of the housings upon moving the latter lengthwise one toward the other and springs to hold the plates in frictional engagement during compression and to return them to normal position upon release.

4. A shock absorber, comprising two housings movable lengthwise relatively to each other, a plurality of intercalated friction plates arranged lengthwise within said housings and on one side of the axis of the same, said plates comprising groups one of which is operatively associated with one of said housings and the other group operatively associated with the other housing, means for producing a pressure against said plates transversely inward or toward the axis of said housings upon moving one of said housings toward the other and relieving said pressure upon separating said housings, comprising friction shoes engaging with the outer longitudinal sides of the friction plates and having wedging engagement with said housings and springs to hold the plates in frictional engagement during compression and to return them to normal position upon release.

5. A shock absorber, comprising two housings movable lengthwise relatively to each other, a plurality of intercalated friction plates arranged lengthwise within said housings and on one side of the axis of the same, said plates comprising groups one of which is operatively associated with one of said housings and the other group operatively associated with the other housing, means for producing a pressure against said plates transversely inward or toward the axis of said housings upon moving one of said housings toward the other and relieving said pressure upon separating said housings, comprising friction shoes engaging with the outer longitudinal sides of the friction plates and having wedging engagement with said housings, and said housings being provided with means for supporting said friction plates on their inner longitudinal sides and springs to hold the plates in frictional engagement during compression and to return them to normal position upon release.

6. A shock absorber comprising two housings movable lengthwise relatively to each other, a plurality of intercalated friction plates arranged lengthwise within said housings and on one side of the axis of the same, said plates comprising groups one of which is operatively associated with one of said housings and the other group operatively associated with the other housing, means for producing a pressure against said plates transversely inward or toward the axis of said housings upon moving one of said housings toward the other and relieving said pressure upon separating said housings, comprising friction shoes engaging with the outer longitudinal sides of the friction plates and having wedging engagement with said housings, and said housings being provided with means for supporting said friction plates on their inner longitudinal sides, release bars each engaging with the outer parts of each group of friction plates, a release spring interposed between the housing, and a friction spring interposed between said release bars.

7. A shock absorber comprising two housings movable lengthwise relatively to each other, a plurality of intercalated friction plates arranged lengthwise within said housings and on one side of the axis of the same, said plates comprising groups one of which is operatively associated with one of said housings and the other group operatively associated with the other housing, means for producing a pressure against said plates transversely inward or toward the axis of said housings upon moving one of said housings toward the other and relieving said pressure upon separating said housings, comprising friction shoes engaging with the outer longitudinal sides of the friction plates and having wedging engagement with said housings and said housings being provided with means for supporting said friction plates on their inner longitudinal sides, release bars each capable of moving longitudinally inward independently of one group of said friction plates but compelling said plates to move longitudinally outward therewith, a release spring interposed between said housings, and a friction spring interposed between said release bars.

8. A shock absorber, comprising two housings movable lengthwise one toward the other and each having an outer transverse head the central part of which is provided with an inwardly projecting boss and the marginal part of which has an inwardly-projecting longitudinal wall, a release spring interposed between the bosses of the two housings, release bars arranged adjacent to the inner sides of said bosses, a friction spring interposed between said release bars, a plurality of intercalated friction plates arranged lengthwise on said housings and comprising two groups one of which is adapted to engage one of said release bars and the other group adapted to engage the other of said release bars, and friction shoes engaging the outer sides of said plates and connected with said release bars, said housings being provided with supports which engage the inner longitudinal sides of said plates, and said housings and shoes being provided with co-operating inclined surfaces for producing a wedging effect to force the shoes inwardly crosswise of the absorber when the housings approach one another.

9. A shock absorber, comprising two housings movable lengthwise one toward the other and each having an outer transverse head the central part of which is provided with an inwardly projecting boss and the marginal part of which has an inwardly projecting longitudinal wall, a release spring interposed between the bosses of the two housings, release bars arranged adjacent to the inner sides of said bosses, a friction spring interposed between said release bars, a plurality of intercalated friction plates arranged lengthwise on said housings and comprising two groups one of which is adapted to engage one of said release bars and the other group adapted to engage the other of said release bars, and friction shoes engaging the outer sides of said plates and connected with said release bars, said housings being provided on their inner sides with longitudinal shelves which engage the inner longitudinal sides of the plates and with transverse ribs for bracing said shelves, and said housings and shoes being provided with co-operating inclined surfaces.

10. A shock absorber comprising two housings which are movable lengthwise toward and from each other and each of which has an outer transverse head and a longitudinal side wall projecting inwardly from the head, a release spring interposed between said housings, release bars arranged transversely on the inner sides of the heads of said housings and provided on their opposing sides with spring seats, a friction spring interposed between said spring seats, two sets of intercalated friction plates arranged lengthwise in said housings on opposite sides of the axis of the same, each set being composed of two groups, the members of one group being adapted to engage and disengage their outer ends with the head of one housing and the members of the other group being adapted to engage and disengage their outer ends with the head of the other housing, and the members of each group being provided at the outer ends thereof with a longitudinal shifting slot the outer end of which is adapted to engage and disengage with the outer edge of the release bar adjacent to the respective housing head and the inner end of the members of each group of plates being provided with clearance slots which receive the adjacent release bar, and friction shoes engaging the outer lateral sides of the two sets of friction plates at opposite ends thereof, and the shoes at the corresponding ends of the friction plates being provided with coupling openings which receive the opposite ends of the corresponding release bar, said housing being provided with shelves which support the two sets of friction plates on the inner longitudinal sides of the same, and the outer sides of said shoes and the inner sides of said housings being provided with co-operating wedge or cam surfaces which serve to press the shoes transversely inward upon moving the housings one toward the other, and said shoes being also provided on their outer sides and near their outer ends with stop lugs which are adapted to engage with the wedges on the housings.

11. A shock absorber comprising two housings which are movable lengthwise toward and from each other and each of which has an outer transverse head and a longitudinal side wall projecting inwardly from the head, a release spring interposed between said housings, release bars arranged transversely on the inner sides of the heads of said housings and provided on their opposing sides with spring seats, a friction spring interposed between said spring seats, two sets of intercalated friction plates arranged lengthwise in said housings on opposite sides of the axis of the same, each set being composed of two groups, the members of one group being adapted to engage and disengage their outer ends with the head of one housing and the members of the other group being adapted to engage and disengage their outer ends with the head of the other housing, and the members of each group being provided at the outer ends thereof with a longitudinal shifting slot the outer end of which is adapted to engage and disengage with the outer edge of the release bar adjacent to the respective housing head and the inner end of the members of each group of plates being provided with clearance slots which receive the adjacent release bar, and friction shoes engaging the outer lateral sides of the two sets of friction plates at opposite ends thereof, and the shoes at the corresponding ends of the friction plates being provided with coupling openings which receive the opposite ends of the corresponding release bar, said housing being provided with shelves which support the two sets of friction plates on the inner longitudinal sides of the same, and the outer sides of said shoes and the inner sides of said housings being provided with co-operating wedge or cam surfaces which serve to press the shoes transversely inward upon moving the housings one toward the other, and said shoes being also provided on their outer sides and near their outer ends with stop lugs which are adapted to engage with the wedges on the housings and said spring seats being of ring shape and surrounding the release spring.

12. In a friction shock absorbing mechanism, the combination with front and rear followers; of a spring resistance; a plurality of longitudinally arranged, intercalated, friction plates interposed between said followers and adapted to be moved relatively upon relative movement of said followers; a plurality of wedges engaged by each of said followers, said followers having means thereon for preventing lateral outward movement of said wedges; a plurality of friction shoes co-acting with said plates, each of said shoes being adapted to co-operate with one of said wedges; and means anchored to certain of said shoes engaging alternate plates to effect restoration of the plates to normal position.

13. In a friction shock absorbing mechanism, the combination with front and rear follower casings; of a plurality of relatively movable friction elements interposed between said follower casings, said elements comprising two sets, each set being movable with one of said follower casings; friction shoes cooperating with said plates and having wedging engagement with one of the casings to effect lateral inward movement of the shoes to compress said elements; a restoring key anchored to said shoes and engaging certain of said elements to restore the latter to normal position; and spring resistance means opposing movement of the shoes.

14. In a draft gear, opposite followers, a set of intercalated friction plates located lengthwise between said followers for engagement thereby upon compression of the gear to move the plates longitudinally inward in opposite directions, means for pressing the friction plates together inwardly transversely of said gear to offer frictional resistance to the inward movement of the followers, said means including shoe members in cooperative relation with the set of friction plates and provided with inclined wedge surfaces, and wedge members cooperating with said wedge surfaces of said shoes and actuated by the inward movement of the followers for forcing said plates together laterally into frictional contact upon compression of said gear, resilient means for resisting the inward longitudinal movement of certain of said members for causing the wedging action between said members, and means for returning the parts to normal position after release of said gear.

15. In a draft gear, opposite followers, a set of intercalated friction plates located lengthwise between said followers for engagement thereby upon compression of the gear to move the plates longitudinally inward in opposite directions, means including sets of cooperating friction shoes and wedge members in cooperative relation with the set of plates at opposite ends of said gear and the respective followers for pressing the plates together inwardly transversely of said gear to offer frictional resistance to the inward movement of the followers upon compression of the draft gear, resilient means for resisting the inward longitudinal movement of one member of each set of said cooperating shoe and wedge members and means to restore the parts to normal position after compression.

16. In a draft gear, opposite followers, groups of relatively movable intercalated friction plates located lengthwise between the followers, one group of said plates being engaged at the outer end of the group by one of said followers and the outer end of the other group by the other follower during compression of the gear for respectively moving said groups of plates longitudinally inward, and wedging mechanism operated by the inward movement of said followers for forcing said plates together inwardly transversely of said gear during the compression of the gear to offer frictional resistance to the inward movement of the followers, yielding means for resisting the movement of said mechanism inwardly longitudinally of the said gear, and resilient means for restoring the parts to normal position after release.

17. In a shock absorber, opposite housings movable towards and away from one another, a set of intercalated friction plates arranged lengthwise between said housings, said plates comprising groups operatively associated with the respective housings for moving the groups longitudinally inward under compression of the shock absorber, and means for producing a pressure against said set of plates inwardly transversely of said gear to offer frictional resistance by said set of plates to movement of one of the housings toward the other housing.

18. In a shock absorber, opposite followers, a set of intercalated friction plates located lengthwise between said followers, said set of plates comprising groups, one of the groups being operatively associated with one of said followers and the other group operatively associated with the other follower, supporting means for one side of the set of friction plates, means interposed between the opposite side of said set of friction plates and said followers for producing transverse pressure on said set of plates to force the set against the said supporting means upon movement of one of said followers towards the other follower, whereby said intercalated plates will offer frictional resistance to inward movement of the followers.

19. In a shock absorber, opposite followers relatively moveable towards and away from one another, groups of relatively moveable intercalated friction plates located lengthwise between the followers with the outer ends of the plates normally spaced from the heads of the respective followers for engagement by the latter after initial movement thereof to move the groups of plates inwardly in opposite directions upon compression of the shock absorber, and means actuated by the inward movement of one of the followers for pressing the plates together inwardly transversely of said gear to offer frictional resistance to inward longitudinal movement of the groups of plates prior to and also during the inward movement of the plates.

JOSEPH M. HALL.